(12) United States Patent
Dahlenburg et al.

(10) Patent No.: US 12,387,171 B2
(45) Date of Patent: Aug. 12, 2025

(54) AUTOMATED MOBILE INVENTORY SYSTEM

(71) Applicant: Trakkit Pty Ltd, Emerald (AU)

(72) Inventors: Peter Dahlenburg, Emerald (AU); Craig Dahlenburg, Emerald (AU)

(73) Assignee: TRAKKIT PTY LTD., Emerald (AU)

( * ) Notice: Subject to any disclaimer, the term of this patent is extended or adjusted under 35 U.S.C. 154(b) by 350 days.

(21) Appl. No.: 17/788,443

(22) PCT Filed: Dec. 22, 2020

(86) PCT No.: PCT/AU2020/051413
§ 371 (c)(1),
(2) Date: Jun. 23, 2022

(87) PCT Pub. No.: WO2021/127729
PCT Pub. Date: Jul. 1, 2021

(65) Prior Publication Data
US 2023/0031912 A1 Feb. 2, 2023

(30) Foreign Application Priority Data
Dec. 24, 2019 (AU) .............................. 2019904936

(51) Int. Cl.
*G06Q 10/087* (2023.01)
*B65D 88/12* (2006.01)
*B65G 1/137* (2006.01)

(52) U.S. Cl.
CPC ......... *G06Q 10/087* (2013.01); *B65D 88/121* (2013.01); *B65G 1/1378* (2013.01)

(58) Field of Classification Search
CPC ... G06Q 10/087; B65D 88/121; B65G 1/1378
See application file for complete search history.

(56) References Cited

U.S. PATENT DOCUMENTS

| 5,065,872 A | 11/1991 | Simon |
| 8,393,127 B1 * | 3/2013 | Jensen ..................... E04H 3/02 |
| | | 52/645 |
| 9,120,624 B1 | 9/2015 | Cassady et al. |

(Continued)

FOREIGN PATENT DOCUMENTS

| WO | 2001023261 A1 | 4/2001 |
| WO | 2013148123 A1 | 10/2013 |
| WO | 2017149365 A1 | 9/2017 |

OTHER PUBLICATIONS

PCT Notification of Transmittal of International Preliminary Report on Patentability mailed Mar. 31. 2022 (15 pages).

*Primary Examiner* — Allen C Chein
(74) *Attorney, Agent, or Firm* — Brooks Kushman P.C.

(57) ABSTRACT

An automated inventory system which enables secure and highly mobile inventory storage. The system comprises a standardized shipping container which houses a plurality of storage locations for storing inventory items in the shipping container. An order picking device is positioned inside the shipping container to move one or more selected inventory items, and a secured inventory portal subsystem is attached to a wall of the shipping container. The portal subsystem comprises an operator station for a user to order and collect the one or more selected inventory items through operation of the order picking device.

19 Claims, 7 Drawing Sheets

(56) References Cited

U.S. PATENT DOCUMENTS

| | | | |
|---|---|---|---|
| 2007/0122035 A1* | 5/2007 | Lai | G06Q 10/0875 |
| | | | 382/181 |
| 2008/0128444 A1* | 6/2008 | Schininger | E05G 1/06 |
| | | | 221/12 |
| 2019/0168392 A1 | 6/2019 | Vain et al. | |
| 2020/0062505 A1* | 2/2020 | Chirnomas | G06Q 20/10 |
| 2021/0022559 A1* | 1/2021 | Zito | A47J 44/00 |

* cited by examiner

AUTOMATED MOBILE INVENTORY SYSTEM

CROSS-REFERENCE TO RELATED APPLICATIONS

This application is a national stage of, and claims priority to, Patent Cooperation Treaty Application No. PCT/AU2020/051413, filed on Dec. 22, 2020, which application claims priority to Australian Provisional Application No. AU2019904936, filed on Dec. 24, 2019, which applications are hereby incorporated herein by reference in their entireties.

BACKGROUND

Numerous types of inventory systems are commonly used on job sites and work facilities. Typically, a system comprises the use of a secured room and stock is controlled by authorized personnel. These systems may be limited in operating time and accessibility due to the requirement to have on-duty personnel during use. Further, auditing of incoming and outgoing stock may be difficult to monitor and prone to human error. The physical inventory room may also be susceptible to vandalism, break-ins, theft, and damage by the elements.

Large items and hazardous materials also pose a risk to personnel during storage and retrieval, and centralised storage is typically required to ensure the availability of stock. Once these inventory systems are set up in a secured location, it is not efficient to move and rehandle or restock new sites. Personnel may therefore need to travel long distances to an established inventory location in order to request and retrieve inventory items.

There is therefore a need for an improved automated mobile inventory system.

BRIEF DESCRIPTION OF THE DRAWINGS

To assist in understanding the disclosure and to enable a person skilled in the art to put the disclosure into practical effect, a preferred embodiment of the disclosure will be described by way of example only with reference to the accompanying drawings, in which.

DETAILED DESCRIPTION

Figure 1:
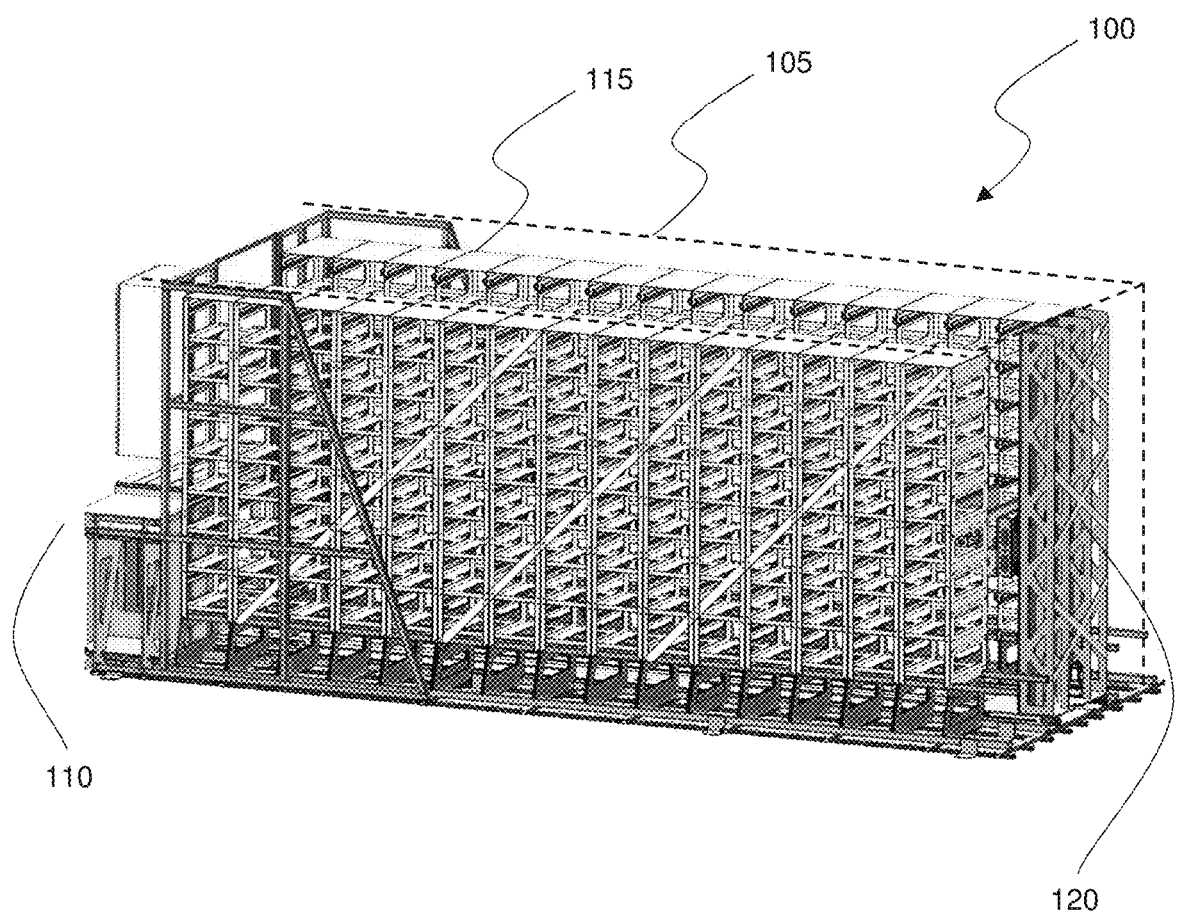
FIG. 1 is a side perspective view of an automated inventory system where the outer skin of the shipping container has been shown in broken lines.

The present disclosure relates to a system, apparatus, and method by which an automated mobile inventory system is integrated with a shipping container. However, it will be appreciated that embodiments of the present disclosure can apply to other forms of inventory storage and dispensing systems. Elements of the disclosure are illustrated in concise outline form in the drawings, showing only those specific details that are necessary to understanding the embodiments of the present disclosure, but so as not to clutter the disclosure with excessive detail that will be obvious to those of ordinary skill in the art in light of the present description.

According to one aspect, the present disclosure is defined as an automated inventory system, the system comprising: a standardized shipping; a plurality of storage locations for storing inventory items in the shipping container; at least one order picking device positioned inside the shipping container to move one or more selected inventory items; and a secured inventory portal subsystem attached to a wall of the shipping container, wherein the portal subsystem comprises: an operator station for a user to order and collect the one or more selected inventory items through operation of the order picking device.

Advantages of some embodiments of the present disclosure include an automated inventory system which utilizes a standard shipping container. By utilizing a standard shipping container, the automated inventory system can be quickly deployed or collected with high mobility and ease of transport. The internal space of the container, defined by an internal length, width, and height, provides efficiency of space for maximum utilisation. Storage locations within the internal space is also modular and configurable to efficiently store items of varying dimensions. Further, a secured inventory portal subsystem attached to a wall of the shipping container ensures security of inventory contents and limits accessibility and use to intended persons.

Those skilled in the art will appreciate that not all of the above advantages are necessarily included in all embodiments of the present disclosure.

FIG. 1 is a side perspective view of an automated inventory system 100 where the outer skin of the shipping container 105 has been shown in broken lines.

Figure 2:
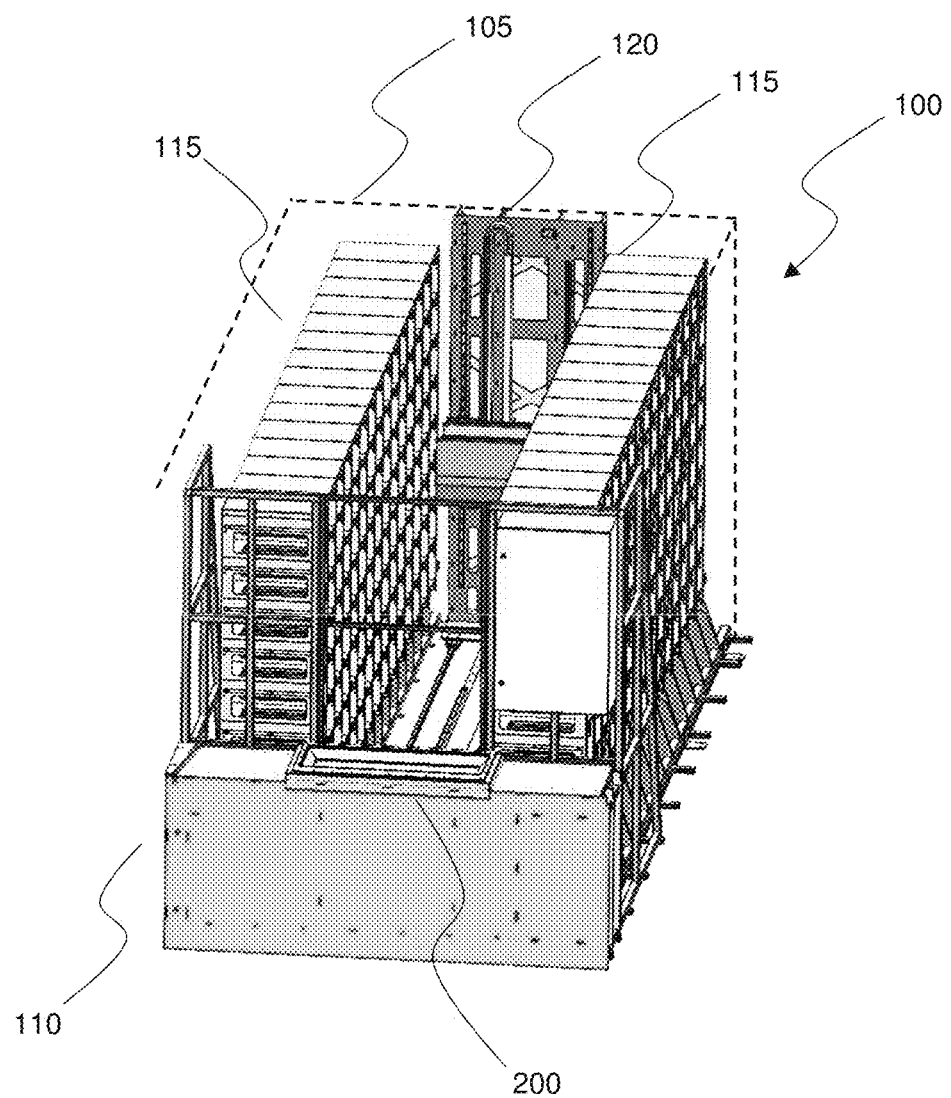
FIG. 2 is a front perspective view illustrating the automated inventory system of FIG. 1 viewed from the end comprising a secured inventory portal subsystem which houses an operator station.

FIG. 2 is a front perspective view illustrating the automated inventory system 100 of FIG. 1 viewed from the end comprising a secured inventory portal subsystem 110 which houses an operator station 200.

In one form, although not necessarily the broadest form, the disclosure resides in an automated inventory system 100, the system 100 comprising: standardized shipping container 105; a plurality of storage locations 115 for storing inventory items in the shipping container 105; at least one order picking device 120 positioned inside the shipping container 105 to move one or more selected inventory items; and a secured inventory portal subsystem 110 attached to a wall of the shipping container 105, wherein the portal subsystem 110 comprises: an operator station 200 for a user to order and collect the one or more selected inventory items through operation of the order picking device 120.

In a preferred embodiment, the automated inventory system 100 utilizes a shipping container 105 of standard size, including but not limited the selection of 10 ft, 20 ft, 40 ft, or high cube shipping containers. The automated inventory system 100 contains a plurality of storage locations 115 which are modular and reconfigurable, with minimal requirement of tools, in order to efficiently use and/or maximise use of the internal space of the shipping container 105. Skilled addressees will understand that specific configuration and layout of the storage locations 115 may be determined according to need and the dimension of goods to be stocked in the inventory system 100.

In a further embodiment, the plurality of storage locations 115 house storage containers (not shown) within which the inventory and storage items are contained. The storage containers may then be divided into further compartments to contain or house one or more selected inventory items. The at least one order picking device 120 can then retrieve the entire storage container which houses the one or more selected inventory items.

Optionally, the storage containers may be custom made to integrate with the configuration of shelving and a gantry which makes up the plurality of storage locations 115. Further optionally, the storage containers may be made from materials including metal or plastics for manufacturability considerations and storage requirements of particular inventory items.

Figure 3A:
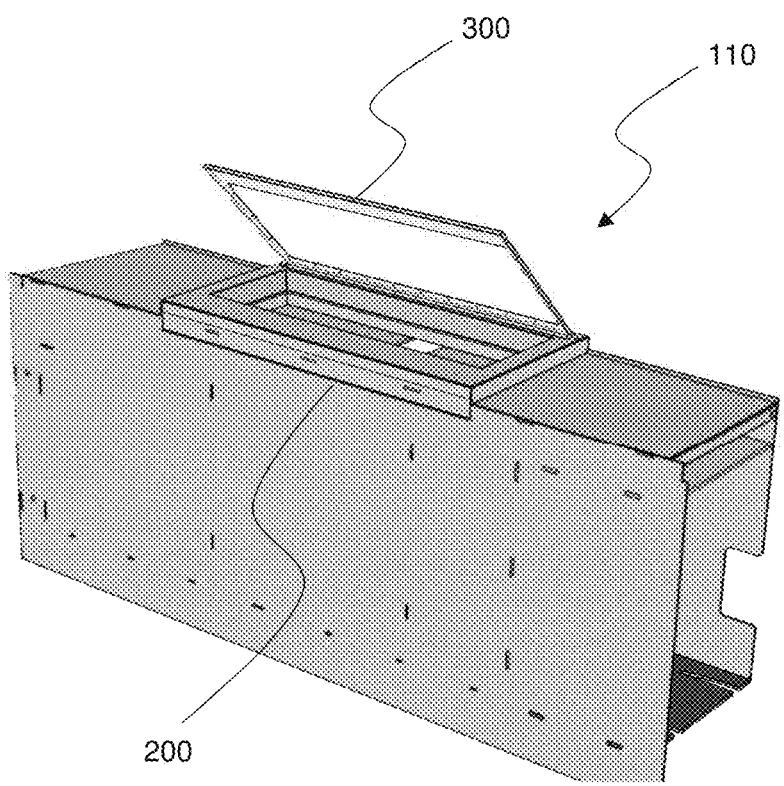
FIG. 3A is a view illustrating an operator station of the secured inventory portal subsystem of FIG. 2 with a transparent lid shown in an open position.

FIG. 3A is a view illustrating the operator station 200 of the secured inventory portal subsystem 110 of FIG. 2 with a transparent lid 300 shown in the open position.

In a preferred embodiment, the operator station 200 allows a user to operate the at least one order picking device 120 to collect the one or more selected inventory items or storage container housed in one of the plurality of storage locations 115. The at least one order picking device 120 will then move the selected inventory item or storage container to the operator station 200. The operator station 200 comprises a transparent lid 300 through which a user can view the selected inventory item before opening the lid 300 to extract the selected inventory item and finalise retrieval. If the item is incorrect, the user can choose to not open the transparent lid 300 so that the retrieval process is not executed and the secured inventory portal subsystem 110 does not register a transaction or record the item as being dispensed.

In a further embodiment, the secured inventory portal subsystem 110 can be attached to the standardized shipping container 105 by welding or fastening. Optionally, the inventory portal subsystem 110 can be attached to an interior or exterior face of an existing wall or door of the shipping container 105. Further optionally, the inventory portal subsystem 110 can be recessed into an existing wall or door of the shipping container 105 after an existing wall or door has been cut, removed, or modified as required. Further optionally, the inventory portal subsystem 110 can be attached to the standardized shipping container 105 so that the inventory portal subsystem 110 becomes a releasably locked and secured access door to the standardized shipping container 105. The skilled addressee will understand that specific attachment method, configuration, and positioning of the secured inventory portal subsystem 110 may be determined once parameters of the automated inventory system are established. These parameters include, but are not limited to, manufacturability, transport mobility, accessibility, security and weatherproofing requirements.

Figure 3B:
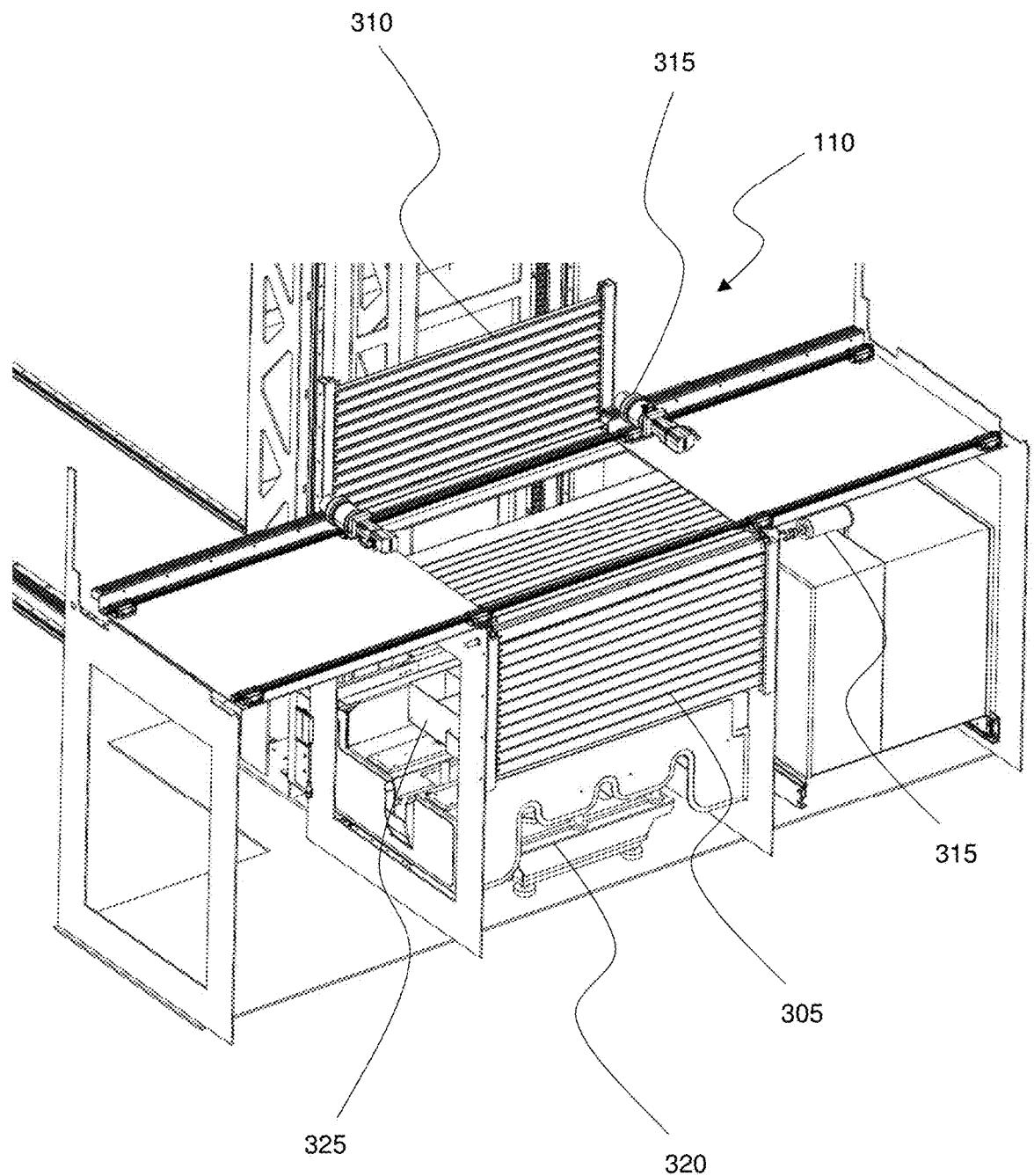
FIG. 3B is a view illustrating an operator station of the secured inventory portal subsystem of FIG. 2 embodied with a roller door, with sheet metal enclosure components hidden.

FIG. 3B is a view illustrating an operator station 200 of the secured inventory portal subsystem 110 of FIG. 2 embodied with a front roller door 305, with sheet metal enclosure components hidden so that internal components may be seen. Optionally, the front roller door may be paired with a rear roller door 310 which allows the north-south opening distance to be controlled. In a preferred embodiment, further internal doors also limit east-west opening, allowing the access opening of the operator system 200 to be fully customisable in size and position, accommodating particular inventory items. The person skilled in the art will understand that suitable motors 315 such as servo motors will be used to drive the roller doors 305, 310 and internal doors.

In a preferred embodiment, the operator station 200 further comprises a weighing device 320. The weighing device 320 allows a storage container 325 to be weighed as it arrives at the operator station 200. After weighing the storage container 325, the user may be given access to a predetermined section of the storage container 325, through an opening dictated by the roller doors 305, 310 and further internal doors. After the required inventory items are removed by the user, the weighing device 320 may weigh the storage container 325 again and establish a weight difference. The weight difference may be used to determine quantity or volume of inventory items removed and calculate any payments required. After weighing the returned storage container 325, the order picking device 120 will return the storage container 325 to its original position. The person skilled in the art will understand that different weighing devices may be used, such as bench scales and other load measuring devices. Optionally, the storage container 325 rests on load measuring pins when being weighed by the weighing device 320, such that a custom surface for receiving the storage container 325 may be used, with only the weight measuring load pins exposed.

Figure 4:
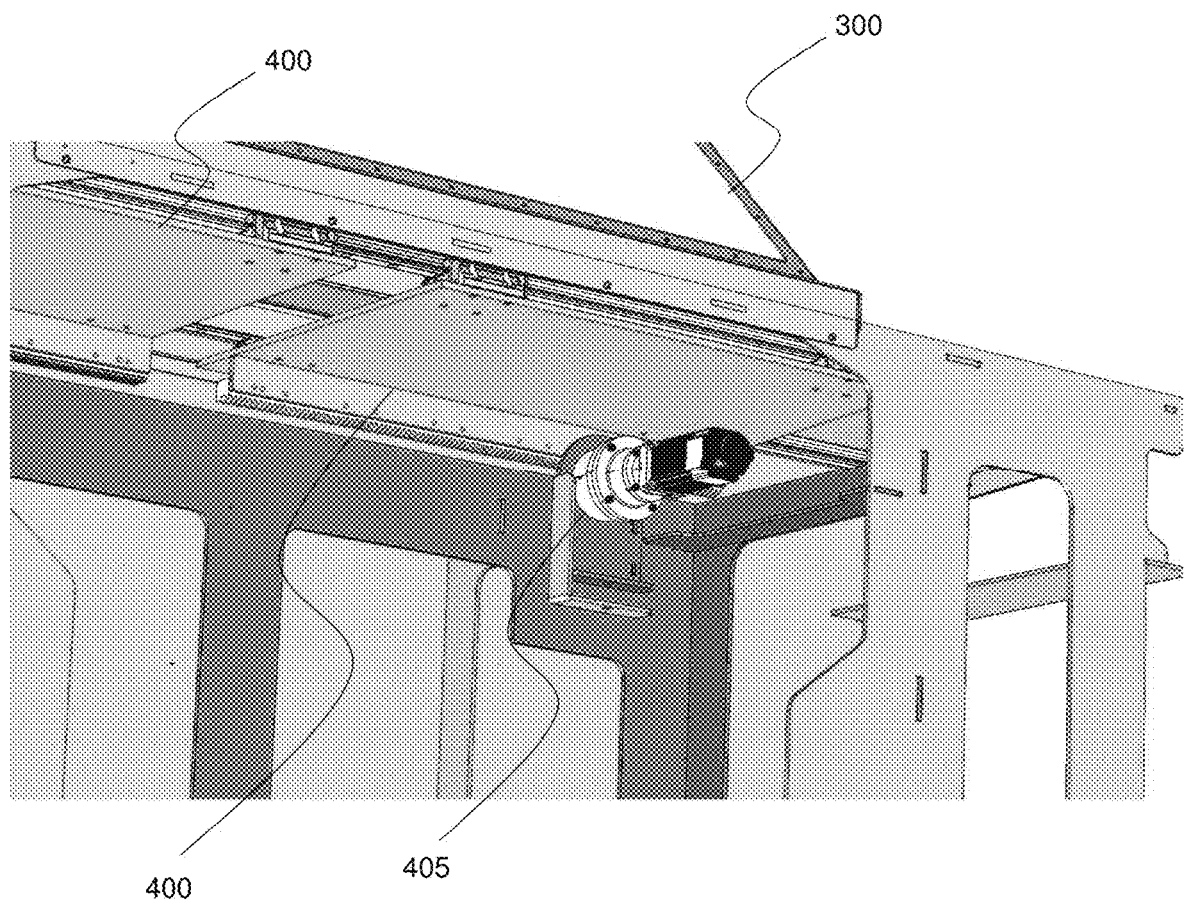
FIG. 4 is an internal perspective view of the operator station and transparent lid of FIG. 3A showing an internal door that corresponds with selected inventory items, wherein the internal door is shown in an open position.

FIG. 4 is an internal perspective view of the operator station 200 and transparent lid 300 of FIG. 3A showing an internal door 400 that corresponds with selected inventory items, wherein the internal door 400 is shown in an open position.

In a preferred embodiment, the operator station 200 also comprises an internal door 400 under the transparent lid 300. The internal door 400 may be made of two opposing sliding panels driven by a screw and knuckle system 405 so that the internal door 400 is able to control the east-west opening size of the access opening. This allows the access opening provided by the internal door 400 to correspond with compartments within a selected storage container 325, so that the user does not have access and/or visibility of other inventory items located within the same selected storage container 325. Optionally, the operator station 200 comprises an integrated scale or measuring system to confirm a particular volume, quantity, or weight of a selected inventory item before allowing the transaction to occur.

In a further embodiment, an administrative user may have access to the full opening provided by the internal door 400 and transparent lid 300. This allows the administrative user to efficiently replace items in compartments or extract an entire empty storage container 325 and refill with a storage container 325 that has been stocked and checked off site. Product information may also be included and easily registered with the automated inventory system 100. The at least one order picking device 120 can then move the refilled storage container 325 or any deposited inventory item to a designated location of one of the plurality of storage locations 115.

Figure 5:
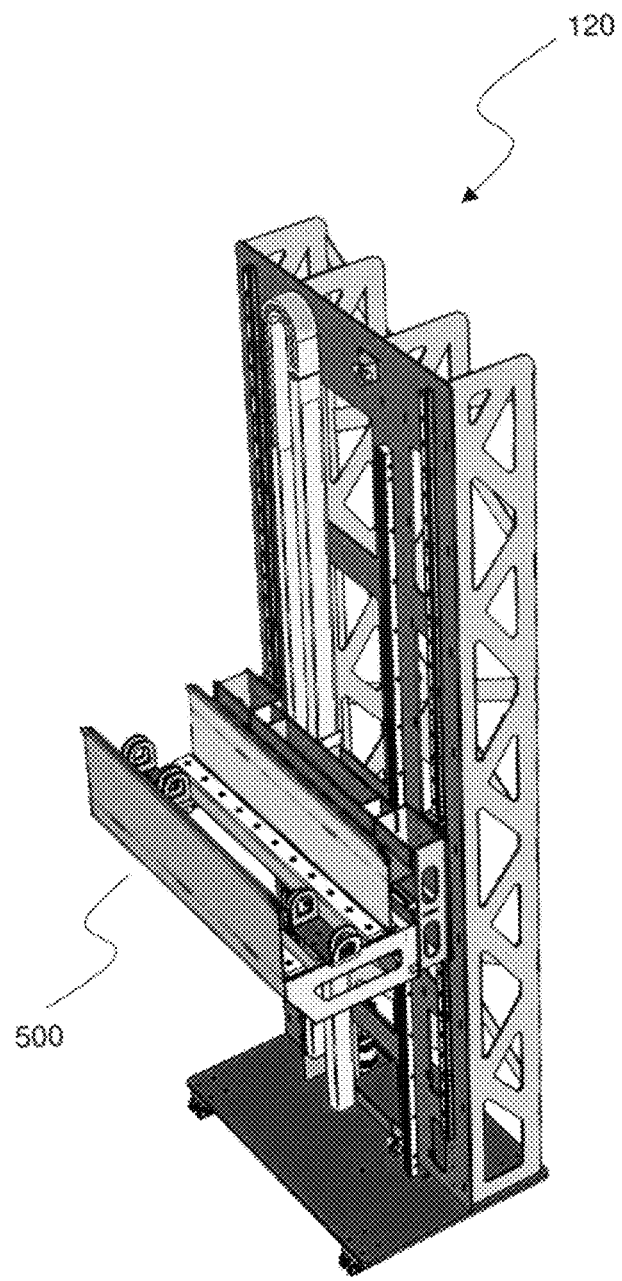
FIG. 5 is a perspective view of an order picking device in the automated inventory system of FIGS. 1 and 2.

FIG. 5 is a perspective view of an order picking device 120 in the automated inventory system of FIGS. 1 and 2.

In a preferred embodiment, the at least one order picking device 120 operates on a three-axis gantry system and can access the entire available space within the shipping container 105 after it has been modified into the automated inventory system 100. Further preferably, the order picking device 120 comprises a picking trolley 500 that retrieves storage containers 325 from the plurality of storage locations 115.

Figure 6:
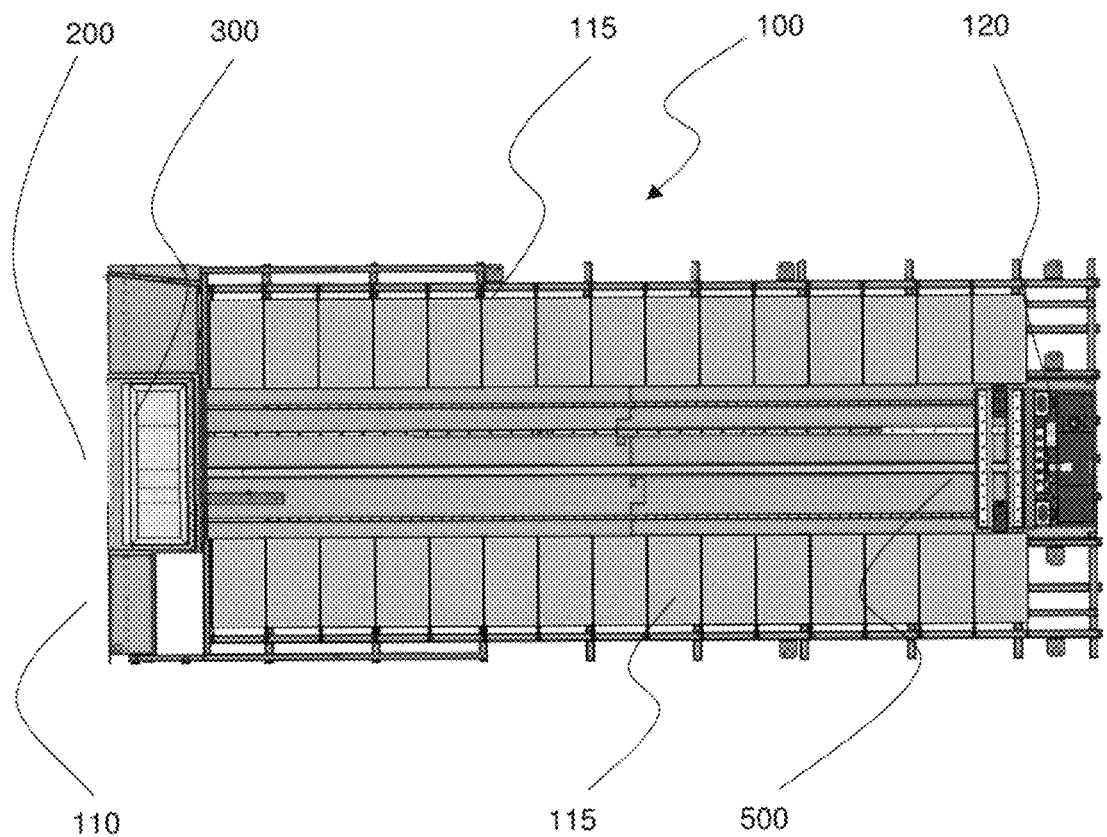
FIG. 6 is a top plan view of the automated inventory system of FIGS. 1 and 2.

FIG. 6 is a top plan view of the automated inventory system of FIGS. 1 and 2.

In a preferred embodiment, the gantry system runs down the centre of the shipping container 105 so that the plurality of storage locations 115 can line the two side walls, effectively maximising the usable space of the automated inventory system 100.

The order picking device 120 is preferably accurate to 5 mm, and more preferably, accurate to 1 mm. Optionally, the order picking device 120 is operated by rack and pinion drive motors with a hook and grab mechanism to interface with the storage containers 325. Further optionally, the order picking device 120 utilizes a rotary configuration on a carousel system. The order picking device 120 may also comprise an integrated scale or measuring system to select, retrieve, and dispense a particular volume, quantity, or weight of an inventory item. The skilled addressee will understand that specific configurations of the order picking device 120 may be determined once parameters of inventory items are established.

In a preferred embodiment, the automated inventory system 100 provides access into the shipping container 105 space using the inventory portal subsystem 110 as a releasably locked hinged door. Further preferably, the automated inventory system 100 comprises safety features such as an emergency stop, safety switches, and pressure switches on all doors. Optionally, the automated inventory system 100 prohibits the order picking device 120 or other mechanical components from moving and operating when an unsafe situation is detected, such as when access doors are open. Further optionally, the automated inventory system 100 includes security features including but not limited to video surveillance, passive infrared sensors, and alarm systems. Image and video capturing via the security features may also assist in establishing chain of custody, evidencing the removal of an inventory item and completion of a transaction. The skilled addressee will understand that specific safety and security features will depend on requirements established by different environments and situations of use.

In a further preferred embodiment, a cloud based backend software tracks, updates, and authorizes inventory or user accessibility information. Optionally, selected users or user groups are authorized to access particular inventory items. As a cloud based backend software it is possible for these commands and settings to be issued remotely, and for the entire mobile inventory system to be controlled by off-site administrative personnel. Optionally, administrative users can monitor the usage and inventory status of the automated inventory system 100. Mechanical diagnosis of breakdowns and errors can also be monitored and addressed from an offsite location via the cloud based backend software. Further optionally, the operator station 200 comprises a payment device so that payment transactions may be made. The payment device may also operate as a payment gateway to a cloud based transaction service. The skilled addressee will understand that specific software features and payment methods are customisable and will depend on requirements established by different environments and situations of use.

In yet another further preferred embodiment, the standardized shipping container is temperature controlled so that a predetermined internal temperature of the shipping container may be maintained. This may include a refrigeration functionality for inventory items requiring low temperature storage, or heating for locations where the ambient environmental temperature is low. The skilled addressee will understand that specific requirements for temperature control will depend on variables such as geographic location, inventory items, and climate during delivery and transit of the mobile inventory station.

The automated inventory system 100 therefore addresses at least some of the aforementioned problems, providing a secure and highly mobile inventory system. As an automated inventory system, auditing and tracking of stock can also be easily maintained, with security and accessibility easily updated by a central system. Inventory consumption information can also be provided to administrators and/or suppliers to adjust volume, stock, and services as necessary. The standardized shipping container also provides proven robustness and resistance to damage from the elements.

In this patent specification, adjectives such as first and second, left and right, top and bottom, up and down, upper and lower, rear, front and side, etc., are used solely to define one element or method step from another element or method step without necessarily requiring a specific relative position or sequence that is described by the adjectives. Words such as "comprises" or "includes" are not used to define an exclusive set of elements or method steps. Rather, such words merely define a minimum set of elements or method steps included in a particular embodiment of the present disclosure.

The above description of various embodiments of the present disclosure is provided for purposes of description to one of ordinary skill in the related art. It is not intended to be exhaustive or to limit the disclosure to a single disclosed embodiment. Numerous alternatives and variations to the present disclosure will be apparent to those skilled in the art of the above teaching. Accordingly, while some alternative embodiments have been discussed specifically, other embodiments will be apparent or relatively easily developed by those of ordinary skill in the art. Accordingly, this patent specification is intended to embrace all alternatives, modifications and variations of the present disclosure that have been discussed herein, and other embodiments that fall within the scope of the above described disclosure, which is determined by the following claims.

The invention claimed is:

1. An automated inventory system, the system comprising:
   a standardized shipping container including a first storage wall and a second storage wall parallel to the first storage wall;
   a plurality of storage locations for storing inventory items in the shipping container, a first subset of the storage locations lining the first storage wall along a length and height of the first storage wall, and a second subset of the storage locations lining the second storage wall along a length and height of the second storage wall;
   at least one order picking device positioned inside the shipping container to move one or more selected inventory items, the at least one order picking device including a gantry system and a trolley, the gantry system arranged to move the trolley along the lengths and heights of the first and second storage walls, the trolley extending perpendicular to the first and second storage walls from the first subset to the second subset; and
   a secured inventory portal subsystem attached to an end wall of the shipping container, wherein the portal subsystem comprises:
     an operator station for a user to order and collect the one or more selected inventory items through operation of the order picking device, the order picking device collecting the one or more selected inventory items from one of the plurality of storage locations;
     wherein the operator station comprises an internal door and a transparent lid, wherein the internal door is able to control an opening size of an access opening that is customisable in size and position, wherein the user is able to view the one or more selected inventory items before opening the transparent lid to retrieve the one or more selected inventory items; and wherein the internal door of the operator station comprises two opposing sliding panels so that the internal door is able to control the east-west opening size of the access opening.

2. The automated inventory system of claim 1, wherein the plurality of storage locations are modular and reconfigurable.

3. The automated inventory system of claim 1, wherein the storage locations extend across an entire length or height or width of the shipping container.

4. The automated inventory system of claim 1, wherein the storage locations comprise storage containers within which the inventory items are contained.

5. The automated inventory system of claim 4, wherein the operator station further comprises a weighing device.

6. The automated inventory system of claim 5, wherein the weighing device is configured to weigh the storage container prior to the user collecting the one or more selected inventory items.

7. The automated inventory system of claim 5 wherein the weighing device is configured to weigh the storage container after the user collects the one or more selected inventory items.

8. The automated inventory system of claim 4 wherein the storage containers comprise an open or transparent top.

9. The automated inventory system of claim 4 wherein the storage containers are divided into a plurality of compartments to contain the one or more selected inventory items.

10. The automated inventory system of claim 1, wherein the secured inventory portal subsystem allows the at least one order picking device to receive one or more restocking items and to deposit the one or more restocking items in one of the plurality of storage locations for storing inventory items.

11. The automated inventory system of claim 10, wherein the secured inventory portal subsystem allows a refilled storage container to be deposited and the picking device to move the refilled storage container to one of the plurality of storage locations for storing inventory items.

12. The automated inventory system of claim 1, wherein the gantry system is a three-axis gantry system and can access an entire length or width or height of the shipping container.

13. The automated inventory system of claim 1 wherein the at least one order picking device operates on a rotary carousel system.

14. The automated system of claim 1 wherein the inventory portal subsystem is hinged and releasably locked to the end wall of the shipping container, wherein the inventory portal subsystem can be unlocked and opened to allow access into the shipping container.

15. The automated inventory system of claim 14, wherein the automated inventory system includes an emergency stop.

16. The automated inventory system of claim 15, wherein the shipping container is a standard 10 foot, 20 foot, 40 foot, or high cube shipping container.

17. The automated inventory system of claim 1, wherein a cloud based software tracks, updates, and authorizes inventory or user accessibility information.

18. The automated inventory system of claim 17, wherein the operator station comprises a payment system and/or device.

19. The automated inventory system of claim 1, wherein the standardized shipping container is temperature controlled.

* * * * *